Dec. 19, 1967   N. N. OKUN   3,358,316
SUCTION CLEANER
Filed Jan. 8, 1965   3 Sheets-Sheet 1

INVENTOR.
NATHANIEL N. OKUN
By James and Franklin
ATTORNEYS

Dec. 19, 1967  N. N. OKUN  3,358,316
SUCTION CLEANER

Filed Jan. 8, 1965  3 Sheets-Sheet 2

INVENTOR.
NATHANIEL N. OKUN
BY *James and Franklin*
ATTORNEYS

Dec. 19, 1967  N. N. OKUN  3,358,316
SUCTION CLEANER
Filed Jan. 8, 1965  3 Sheets-Sheet 3
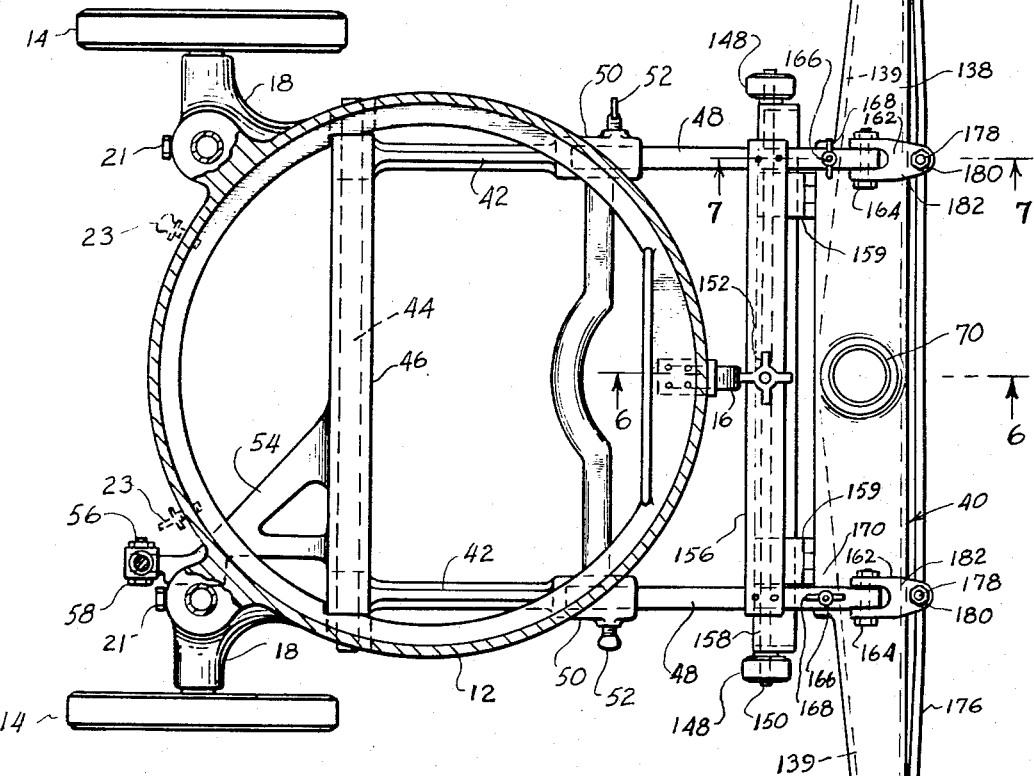
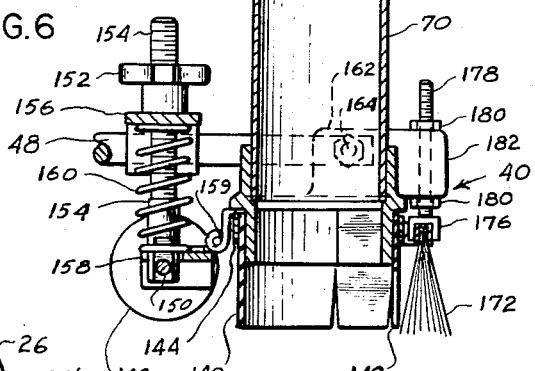
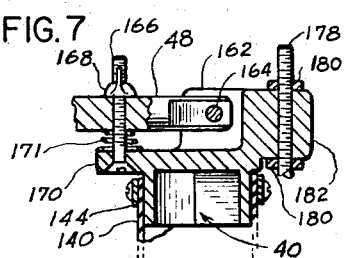
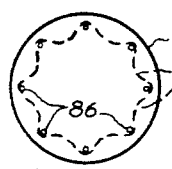
INVENTOR.
NATHANIEL N. OKUN
BY James and Franklin
ATTORNEYS

United States Patent Office 3,358,316
Patented Dec. 19, 1967

3,358,316
SUCTION CLEANER
Nathaniel N. Okun, Cedarhurst, N.Y., assignor to Atlas Floor Surfacing Machinery Corporation, New York, N.Y., a corporation of New York
Filed Jan. 8, 1965, Ser. No. 424,329
3 Claims. (Cl. 15—352)

This invention relates to suction cleaners, and more particularly to such a cleaner of large size for use in public halls and buildings or the like.

The general object of the present invention is to improve suction cleaners, particularly large suction cleaners using multiple motors and fans. The motors are protected against dust, which is done by successive filtration, there first being a dust collector bag which may be made of fabric, but which more usually is a disposable porous paper bag. Next, there is a large filter surface which, in the present case, is inverted frusto-conical in shape. Then there are filter discs for each of the blowers.

Efficiency is lost by caking of dirt in the collector bag and/or on the filter surface. One important object of the present invention is to provide for dislodging such dirt, thereby clearing much of the bag surfaces. For this purpose I provide what may be termed a breather filter, which is drawn one way by suction, and is restored in opposite direction by resilient means. Moreover, the collector bag and the breather filter are so disposed that they engage and move one another or interact during breathing movement of the filter.

To accomplish the foregoing objects and other objects which will hereinafter appear, my invention resides in the suction cleaner elements and their relation one to another, as are hereinafter more particularly described in the following specification. The specification is accompanied by drawings in which:

FIG. 5 is a horizontal section taken approximately on the line 5—5 of FIG. 1, and shows the wheeled carriage and the pivoted frame which carries the nozzle;

FIG. 6 is a fragmentary vertical section taken on the line 6—6 of FIG. 5;

FIG. 7 is a fragmentary vertical section taken approximately on the line 7—7 of FIG. 5, and shows means for adjusting the angle of the nozzle; and FIG. 8 is a horizontal view explanatory of one aspect of the breathing action of the breather filter.

Figure 1:
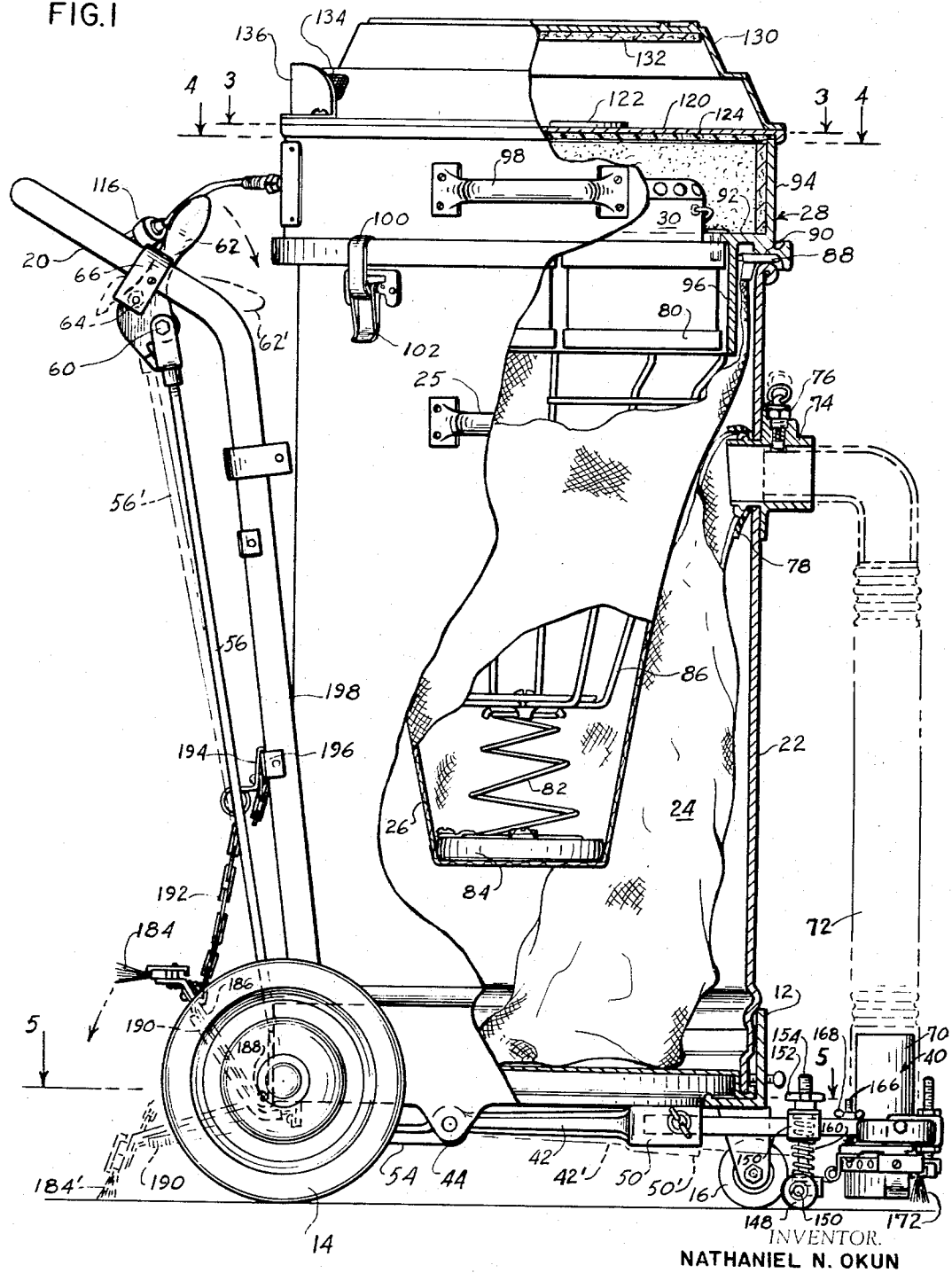
FIG. 1 is a partially sectioned side elevation of a suction cleaner embodying features of my invention.
Figure 2:
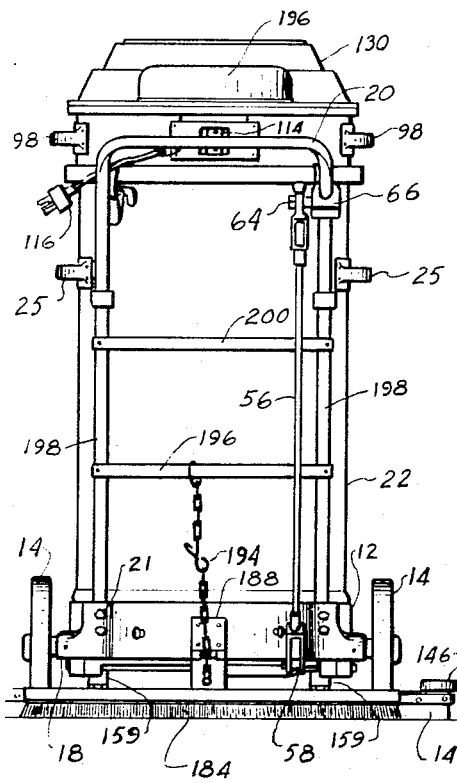
FIG. 2 is a rear elevation of the same drawn to smaller scale.

Referring to the drawing, and more particularly to FIGS. 1, 2 and 5, the suction cleaner comprises a generally circular frame 12 carried by two main wheels 14 at the rear of the frame, and a freely pivoted swivel wheel 16 (FIG. 1) at the front. The frame 12 is preferably a casting and includes projections 18 (FIG. 5) for the stub axles of the wheels 14, the latter being rubber tired. These cast projections 18 also provide sockets for the lower ends of a tubular carriage handle 20 (FIGS. 1 and 2), the lower ends of the handle being secured in the frame by appropriate screws 21 (FIG. 5).

Figure 4:
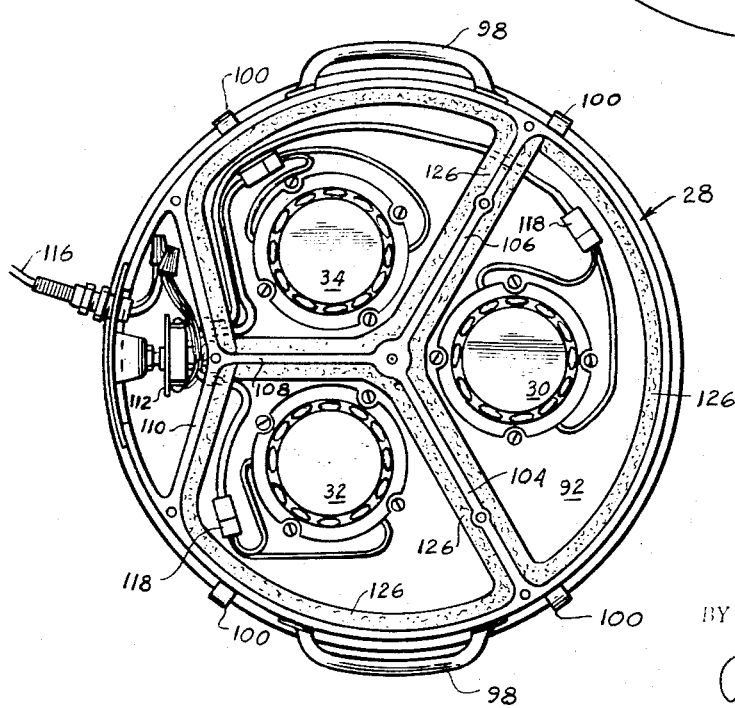
FIG. 4 is a horizontal view of the motor head and is taken approximately on the line 4—4 of FIG. 1.

The circular frame 12 has a deep flange within which an upright cylinder 22 is received. It is detachably locked in position by a number of thumb screws indicated at 23. It is also provided with handles 25, so that the cylinder may be removed and inverted should some dust collect in it. In FIG. 5 the cylinder has been removed from the frame. The cylinder 22 houses a dust collector bag 24 (FIG. 1) and an inverted frusto-conical breather filter 26. The cylinder is closed at the top by a motor head 28 which carries a plurality in this case three, fan and motor units, one of which is shown at 30 in FIG. 1. FIG. 4 shows the three units at 30, 32 and 34.

An elongated nozzle, generally designated 40 (FIGS. 1 and 5), is disposed at the front of the cleaner. It is carried by a frame 42 pivoted at 44. FIG. 5 shows the spaced arms 42 of the frame connected by a tubular part 46 which is received over the pivot rod 44. The nozzle 40 has rearwardly projecting rods 48 detachably received in sockets 50 formed at the forward ends of the arms 42, the rods being locked in the sockets by thumb screws 52, for easy change of nozzle. The frame is projected rearward by an arm 54, and referring now to FIGS. 1 and 2, it will be seen that arm 54 may be raised or lowered by means of a generally upright link 56, the lower end of which is pivotally connected to the frame at 58 (FIGS. 2 and 5), and the upper end of which is pivotally connected at 60 (FIG. 1) to a control lever 62, the latter being pivoted at 64 on a bearing member 66 mounted on the carriage handle 20. With lever 62 in the raised position shown in solid lines, the frame is tilted to raise the nozzle 40 from the floor, as shown in FIG. 1. By moving the lever 62 downward to the broken line position 62' the link 56 rises to the broken line position 56', permitting the frame 42 and nozzle 40 to move downward gravitationally, as shown in broken lines at 42' for the frame.

The nozzle 40 has a vertical outlet 70 of substantial diameter, say two inches, and this is connected by a flexible hose 72 to an inlet 74 which passes through the front wall of cylinder 22 at an elevated point. The hose preferably is readily detachable, and a lock may be provided, as indicated at 76.

The dust collector bag 24 may be made of fabric, or more usually is a disposable paper bag. In either case it is provided with a neck 78 dimensioned to be received with a detachable snap fit over the inner end of the inlet 74. The bag 24 provides a first stage of filtration.

A second stage of filtration is provided by the breather filter 26, and a third stage of filtration is provided by a filter disc applied at 80 directly beneath each fan. The breather filter 26 is provided with resilient means 82 which urges the filter in a direction opposite to the effect of the suction. In the present case, the filter is inverted frusto-conical in shape, and it is urged downward by a spring 82, the latter preferably carrying a rubber ring 84 to avoid injury to the fabric. Under suction the spring is compressed somewhat, the filter being drawn inward and upward. When the motors are stopped, the spring moves the filter bag to original taut position.

In the preferred form shown there is a wire frame 86 which is somewhat basket-shaped, and disposed inside the filter 26. The upper ends of the upright wires extend around the motor frame part 96 to a rubber-covered metal ring or flange 88 which rests on top of cylinder 22, and is tightly clamped in position by the rim or flange 90 of the motor head. The filter fabric 26 also is secured to the ring 88.

Referring now to FIG. 8, the breathing action is somewhat more complex than so far indicated, because under suction, the fabric 26 tends to be drawn inward toward or against the wires 86 of the frame, as is schematically shown by the change from the solid line position 26 to the dotted line position 26'. When the motors are stopped the action of the restoring spring is to pull the fabric taut, and thus to move it back out to the solid line position 26.

This breathing action dislodges from the outer surface of the filter dust or dirt which tends to obstruct the pores of the filter and to reduce the efficiency of the cleaner.

The filter preferably comprises two layers or bags, the inner one being made of canvas or rhino cloth, and the outer one being made of dacron or some like synthetic fabric which easily sheds dirt.

Under suction the dust bag 24 expands, compared to the collapsed rest condition shown in FIG. 1, and the bag 24 and filter 26 are so dimensioned and so relatively located that they engage and move one another. Thus the spring action of the breather filter is important not only to clean the filter itself, but also in assuring some collapse or movement of the dust bag 24, to dislodge dirt which tends to be caked around its inside wall.

Referring now to FIG. 1, the motor head 28 comprises a horizontal mounting plate 92 surrounded by a cylindrical wall 94. An inside depending wall 96 of smaller diameter may be provided to protect the fans when the head is removed and rested on some surface. The head may be removed by means of a pair of handles 98, after opening four hooks 100 by means of their lock handles 102.

Referring now to FIG. 4, the head 28 is divided into three main compartments by upright partition walls 104, 106 and 108. These divide the head into three compartments, each receiving one of the motor units 30, 32 and 34. In the present case an additional partition wall 110 provides a small rear compartment in which three superposed switches 112 are provided, one for each motor, the handles of these switches being conveniently accessible at the rear of the machine, as shown at 114 in FIG. 2. The power supply lead 116 passes into the switch compartment for connection to the individual switches, and additional wires pass through the partition wall 110 to the individual motors, each motor preferably having a detachable connector, as shown at 118. The conductors fit snugly in the partitions to prevent air leakage.

In the particular case here shown the fan and motor units are made by Lamb Electric Company of Kent, Ohio. The motors are one HP motors, and move nearly 100 cubic feet per minute each. The motors are small because they turn at high speed, say 16,000 r.p.m. The fans are of the sirocco blower type, and the units are non-bypass, that is, the air passes through the motor and is discharged at the top of the motor, as is indicated by the ring of openings shown in FIG. 4. The air helps cool the motor. The disc filters 80, preferably applied to the bottom of each blower, may be made of plastic sponge of a fibrous vinyl filter material or other suitable filter material. The terms blower and fan are here used interchangeably.

Figure 3:
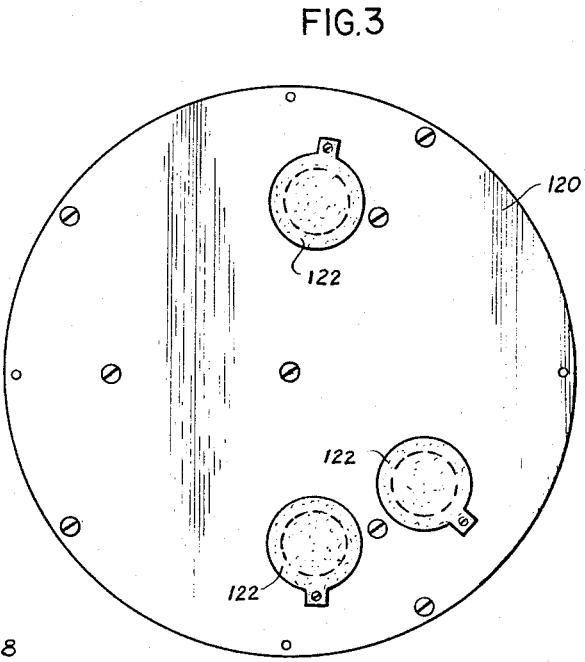
FIG. 3 is a horizontal view of a valved cover plate which closes the top of the motor compartments, and is taken approximately on the line 3—3 of FIG. 1.

The motor head is closed at the top, and the individual compartments are sealed one from another by means of a cover plate 120, best shown in FIG. 3. This is provided with check valves for the individual fans. More specifically, there is a flap valve 122 over each of the compartments. The flap valve is made of live rubber or other suitable flexible material. A motor in operation simply raises the flap, but if a motor is shut off, the flap is closed by the suction of the other motors, thus guarding against loss of suction. In this way any one or any combination of motors may be used, which is convenient because the present cleaner otherwise would be too powerful for use where lesser suction is wanted, for example when cleaning drapes.

For that purpose the short hose 72 shown in FIG. 1 is disconnected by releasing the lock 76, and is replaced by the end of a long flexible hose to which any desired cleaning accessory may be applied.

Reverting to FIG. 3, it will be seen that each flap valve preferably is offset well away from the axis of the motor. This is done to help silence the noise otherwise caused by the high velocity air. The bottom of cover plate 120 then acts as a deflector, and carries a thick layer 124 (FIG. 1) of sound-deadening material, such as sponge rubber. The vertical walls and partitions of the motor head also are lined with sound-deadening material, indicated at 126 in FIG. 4.

The cover plate 120 is surmounted by an additional closure or top 130 (FIG. 1), which in the present case has a somewhat frusto-conical shape. This top acts as another deflector, and also is lined with sound-deadening material, indicated at 132. The air is discharged through an arcuate opening 134 at the rear of the top 130, and an arcuate upright deflector 136 may be provided to guide the air upward. The top 130 is screwed to the cover plate 120, and the latter is screwed to the motor head 94. These parts are removed as a unit and set aside when changing a filled dust bag 24. After removing the motor head the breather filter is removed as a unit, that is, the wire basket 86, the bag 26, and their supporting ring 88 are removed as a unit. This fully exposes the dust bag 24 for removal and replacement.

The nozzle 40 may be described with reference to FIGS. 5 and 6 of the drawing. It comprises an elongated trough-shaped casting 138, which preferably has a straight front edge, so that it can come close to a room wall. The rear edge 139 diverges or expands toward the center where the upright hose connection 70 is provided. The nozzle has a closed top, except for the hose connection 70, and has a continuous peripheral wall. Actual contact with the carpet is made by means of a rubber strip disposed edgewise. At the rear of the nozzle this strip 140 (FIG. 6) is continuous. At the front of the nozzle the strip has vertical slits 142 at intervals, say ¾ of an inch apart. The rubber strip extends entirely around the nozzle, it being secured thereto, as by means of a metal clamp strip 144. The slits act as high velocity passages through which air passes at high speed, it being kept in mind that the three fans working together move air at a rate approaching 300 cubic feet per minute. The top of the nozzle may be provided with small guard wheels 146 (FIG. 5). These are freely rotatable, and act also as guide wheels when running close to a room wall.

The spacing of the nozzle from the floor is controlled by the provision of small nozzle support wheels 148. These are carried by a rod or axle 150, the height of which relative to the horizontal rods 148 is controlled by an internally threaded hand wheel or thumb nut 152. This is received on a screw 154 which extends downward from a cross bar 156 extending between the rods 48, and rigidly secured thereto. Axle 150 passes through a hole in the lower end of screw 154, as shown in FIG. 6.

Referring to FIG. 6 the axle 150 is carried in a bearing strip 158 having downturned ends, and the adjusting screw 154 extends through a notch in the bearing strip. A compression spring 160 preferably is disposed around the screw 154 to urge the support wheels downward. In the particular structure here shown the nozzle is hingedly connected at 159 to the strip 158 (FIGS. 5 and 6). It will be evident that by adjusting the handle 152 the height of the nozzle is varied relative to the position of the support wheels, the latter being assumed to rest on the floor when released by the lever and linkage previously described and shown in FIG. 1.

For optimum operation the bottom of the nozzle should be parallel with the floor. Adjustment of height depends on whether the device is used on a smooth floor or a carpet, and in the latter case, whether the pile is short or long. A substantial adjustment changes the angle of the nozzle, and in the present case an additional adjustment is provided to restore the desired parallel relation to the floor. By eliminating the hinges 159 the change of angle would be less, but it then would be more difficult to securely mount the support wheels on the nozzle, and there still would be some change of angle.

Referring to FIGS. 5 and 7, the top 138 of the cast nozzle is provided with upstanding ears 162 preferably cast integrally with the nozzle, and these receive horizontal pivots 164 which extend longitudinally of the nozzle. The pivots pass through the forward ends of the support rods 48, and thus make it possible to change the angle of the nozzle relative to the support rods. For this purpose two vertical adjusting screws are provided; these screws being shown at 166, and receiving wing nuts 168. The screws extend down to a rearwardly projecting flange 170 at the top of the nozzle. Here again the screws preferably are surrounded by compression springs 171 (FIG. 7) disposed between the support rods 48 and the nozzle flange 170, and tending to turn the nozzle in one direction. By tightening the wind nuts 169 the nozzle may be tilted in opposite direction. Thus a change in angle caused by adjustment of height at hand nut 152 may be compensated at wing nuts 168.

The front of the nozzle may carry a brush 172 (FIG. 6) which serves the purpose of agitating the pile or nap of the carpet, and of loosening dirt, and picking up lint. The ends of the nozzle have inwardly turned guides 174 (FIG. 5) which afford vertical adjustment of the brush. To provide such adjustment the channel or backing 176 of the brush carries two vertical screws 178, the position of which may be altered by means of clamp nuts 180. The screws 178 pass through forward projections 182, most conveniently formed integrally with the bearing ears 162 previously referred to.

Because of the size and weight of the present cleaner, the carriage wheels 14 and 16 tend to leave tracks in a carpet. To erase such tracks I provide a trailer brush shown in raised position at 184 in FIG. 1. The brush 184 is shown in lowered position in FIG. 2. It is longer than the spacing of the carriage wheels 14, and so serves to erase all of the wheel tracks, the other wheel tracks being between those of the wheels 14.

Reverting to FIG. 1, the brush 184 is carried at the end of an arm 186 which is pivoted at 188. This arm is normally pulled downward by means of a pull spring 190, but may be held upward by means of an anchor chain 192 having a hook 194 which is received over a cross bar 196 extending between the side tubes 198 of the carriage handle 20. As will be seen in FIG. 2, the handle has two such cross bars 196 and 200 to stiffen and strengthen the same. When the chain 192 is unhooked the pull spring 190 pulls the brush 184 from the raised position shown in solid lines to the broken line position 184' shown in broken lines.

It is believed that the construction and operation of my improved suction cleaner, as well as the advantages thereof, will be apparent from the foregoing detailed description. There are multiple powerful motors to move a large volume of air at high velocity. The motors are protected by successive stages of filtration, including the use of a dust bag and a breather filter which interengage and move one another to dislodge any collected or caked dirt. The breather filter is provided with resilient means to restore it to rest position after movement caused by suction. Any one or more of the motors may be used without loss of suction through an idle motor, and sound produced by high velocity air is deadened by the indirect air discharge path provided, and by the generous use of sound- absorbent lining. The elongated nozzle, which exceeds two and one-half feet in length, is readily adjustable in height, and there is a further adjustment to change the angle of the nozzle to compensate for any change of angle produced by the adjustment of height. A lead brush is independently adjustable in height relative to the nozzle, and a trailer brush is provided to erase any wheel tracks which may be produced in the carpet by the carriage wheels of the cleaner.

It will be understood that while I have shown and described the improved cleaner in a preferred form, changes may be made in the structure shown without departing from the scope of the invention, as sought to be defined in the following claims.

I claim:

1. A suction cleaner of large size comprising a nozzle connected to a relatively long upright dust collector bag, a suction blower and motor above the collector bag, and a relatively long upright; breather filter below the blower between the bag and the blower, said breather filter including a flexible filter, and resilient means to stretch the filter taut in a direction opposite to the direction in which it is moved by the suction of the blower, the bag and filter being so shaped and dimensioned and relatively located that they engage and move one another during operation, whereby the breathing action of the breather filter helps clear the bag as well as the filter of clogging by accumulated dirt.

2. A suction cleaner comprising a large diameter upright cylinder, a wheeled carriage detachably receiving the lower end of the cylinder, a carriage handle, a nozzle in front of said carriage, a hose extending upward from the nozzle to an inlet through the cylinder wall at an elevated point, a dust collector bag detachably secured to the hose inlet and hanging down inside the cylinder, an inverted frusto-conical breather filter having an annular flange at the top of the cylinder and depending into the cylinder in contact with the collector bag, a somewhat smaller frusto-conical wire frame inside the filter and having a compression spring at its lower end to stretch the filter taut and to yield somewhat when the filter is under suction, and a motor head on top of the cylinder with multiple blowers and motors over said filter, said frame having widely spaced longitudinal wires, and said resilient means having a force light enough to yield when the blower operates to permit said fabric filter to be drawn inward between said wires, the collector bag and the breather filter being disposed collaterally and being so shaped and dimensioned and relatively located that they engage and move one another, whereby the breathing action of the breather filter helps clear the bag as well as the filter of clogging by accumulated dirt.

3. A suction cleaner comprising an upright cylinder, a wheeled carriage receiving the lower end of the cylinder, a carriage handle, a nozzle in front of said carriage, a hose extending from the nozzle to an inlet through the upper portion of the cylinder wall, a dust collector bag detachably secured to the hose inlet inside the cylinder, an inverted frusto-conical breather filter having an annular flange at the top of the cylinder and depending deeply downward into the cylinder, a somewhat smaller frusto-conical wire frame inside the filter and having a light compression spring beneath its lower end to stretch the filter taut and to yield somewhat when the filter is under suction, said frame having widely spaced longitudinal wires, said compression spring having a force light enough to yield whenever the blower operates in order to thereby permit said fabric filter to be drawn inward between said spaced wires by suction, and a motor and fan mounted on top of the cylinder over the open top end of the filter, and means to support one end of said collector bag in raised position so that it is alongside said filter and is in contact therewith over a substantial area, so that the breathing action of the breather filter helps clear the bag as well as the filter of clogging by accumulated dirt.

References Cited

UNITED STATES PATENTS

| 922,677 | 5/1909 | Dickason | 15—354 |
| 1,661,979 | 3/1928 | Ugolini | 15—50 |
| 2,193,784 | 3/1940 | Smith | 55—419 XR |
| 2,639,001 | 5/1953 | Meyerhoefer. | |
| 2,719,596 | 10/1955 | Kent et al | 55—304 XR |
| 2,962,118 | 11/1960 | Lee et al | 15—326 XR |

FOREIGN PATENTS

| 1,082,823 | 6/1954 | France. |
| 948,636 | 9/1956 | Germany. |

ROBERT W. MICHELL, *Primary Examiner.*